May 24, 1960

R. E. NOVKOV 2,937,432

ADJUSTABLE CHIP BREAKER

Filed May 19, 1958

INVENTOR.
RAYMOND E. NOVKOV
BY
ATTORNEY

INVENTOR.
RAYMOND E. NOVKOV
BY J. William Freeman
ATTORNEY

United States Patent Office 2,937,432
Patented May 24, 1960

2,937,432
ADJUSTABLE CHIP BREAKER

Raymond E. Novkov, 1026 Seward, Akron, Ohio

Filed May 19, 1958, Ser. No. 736,361

7 Claims. (Cl. 29—96)

This invention relates to the art of cutting tools and in particular has reference to the adjustment of chip-controlling elements that are normally employed in association with such cutting tools.

In the prior art of cutting tools, it has long been known that the chip that is cut from a revolving stock can be controlled as to size and length by use of a chip breaker. Normally, chip breakers of this type include a wear surface that is inclined to the cutting edge so that the chip will, in effect, roll up the inclined surface to form into a spiral that is easily removed.

In the art of chip breaking, it has been found that the perfect chip will resemble a figure 9 so as to have one complete curl provided in the same before breaking of the chip. While it is entirely possible to employ chip breakers of the known prior art in machining operations involving continuous operation on the article, it has been found that in many cases where the cutting tool is repetitively employed on successive pieces of stock, that the hardness, or brittleness, of the stock will change from piece to piece with the result that it frequently happens that the chip formation will also change during the machining operation.

The above condition can result in a detrimental operation of the cutting tool since a chip that is too long in nature is disadvantageous, while a chip that breaks off too quickly, so as to be extremely short, is also disadvantageous.

In the prior art, when a situation of the above described type has been encountered, it has been found necessary to stop the machine and reset the angle, or distance, of the chip breaker, with this normally being accomplished by loosening the screws that retain the same in place, followed by repositioning of the device so as to cause a different type of chip to be created.

It is, of course, manifest that the foregoing type of adjustment is, at best, time consuming and, accordingly, costly. Additionally, this prior-art method has the disadvantage that the same can only accomplish the desired result by "cut-and-dry" methods, with the result that, even upon resetting of the chip breaker angle, the chip created may not be satisfactory, with the result that one or more additional resetting attempts must be made before proper accuracy is obtained.

In copending application, Serial Number 688,306, filed October 4, 1957, by Raymond E. Novkov, there was provided a cutting tool that featured a chip breaker that was rotatably journaled on the tool body pre se, with means being provided to facilitate rotation of the chip breaker element relatively of the tool body during the cutting operation. In this manner the position of the chip breaker could be adjusted from piece to piece during operation of the tool so that a constantly uniform type of chip could be obtained regardless of the stock that was encountered.

While a chip breaker device of this general characteristic has been found to be satisfactorily operative, the same has been disadvantageous in that the method of rotating the chip breaker was relatively expensive, with the result that the use was avoided wherever possible. Specifically, in the above reference to copending application, rotational or relative movement of the chip breaking element with respect to the tool was facilitated by worm-gear type of connection, with the chip breaking element being journaled concentrically with a pinion that meshed with a worm gear so as to effectuate rotation around a given point.

In this regard, it was frequently found that, in addition to being costly, the above type of arrangement was susceptible to clogging, with the result that the tool had to be frequently disassembled for cleaning purposes.

It has now been discovered that improved results will be obtained if a simple thread-and-block type of advancing mechanism is employed to pivot the chip breaking element around a separate and spaced pivot point. Specifically, by moving a pin type of block relatively of a threaded shaft that is rotatably journaled on the tool body, and by further interconnecting this block at an appropriate point on the chip breaker, it has been found that a rotational movement can be applied at a spaced distance from the point of pivotal mounting of the chip breaker on the tool body. In this fashion, a greater turning or rotational force can be imparted due to the presence of moment arm that serves to more easily move the chip breaking element under actual cutting conditions.

It is accordingly the principal object of the invention to provide an improved type of adjustable chip breaker that is characterized by the presence of a simplified and highly efficient type of actuating means that effectuate rotational movement of the chip breaking element relatively of the tool body during actual cutting conditions.

These, and other objects of the invention, will become more apparent upon reading of the following specification, considered and interpreted in the light of the accompanying drawings.

Figures 1, 2, 3:
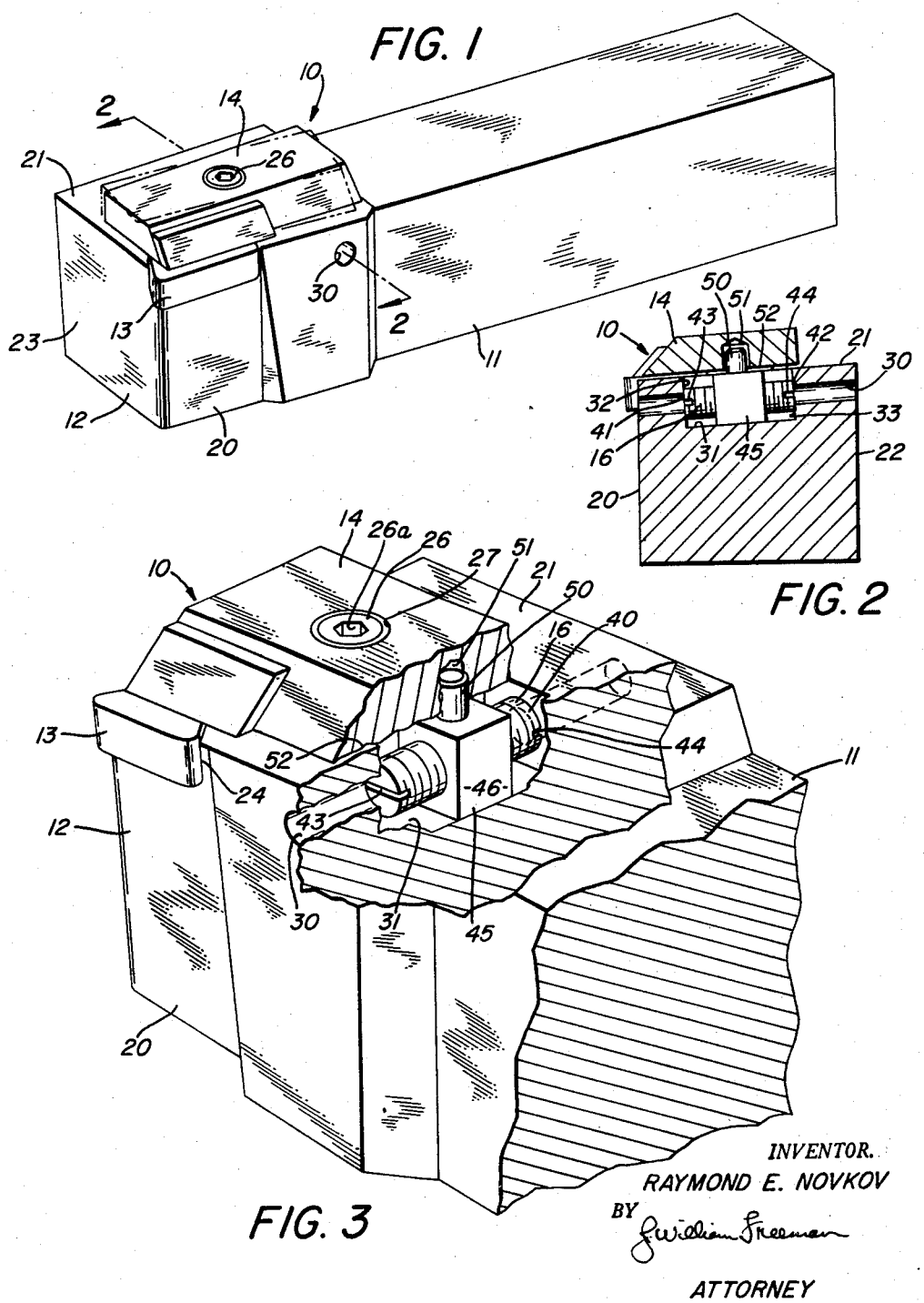
Figure 1 is a perspective view of the improved adjustable chip breaker assembled on a cutting tool.
Figure 2 is a sectional view taken on the lines 2—2 of Figure 1.
Figure 3 is a perspective view taken at different angles and being partly broken away and in section to more clearly illustrate the interrelationship of the component parts.

Referring now to the drawings and, in particular, to Figures 1 to 3 thereof, it will be seen that the improved adjustable chip breaker, generally designated by the numeral 10, includes a shank portion 11 and a head portion 12, with the head portion 12 being contoured for reception of a cutting bit 13 and a chip breaking element 14 that is movable between the full and chain-dotted line positions of Figure 1 upon operation of adjustment means 16.

Considering first the structure of the head portion 12, it will be seen that the same includes a front face 20, a top face 21, and a rear face 22 (Figure 2), that each terminate at one edge thereof in an end face 23, as is clearly shown in Figure 1 of the drawing. In this regard, a seat 24 is shown defined by a recess that intersects the front, top and end surfaces 20, 21 and 23 respectively, so as to define a pocket within which the cutting bit 13 may be received, with the cutting bit 13 and the seat 24 being illustrated as being triangular in plan so as to facilitate use of a six-edged cutting bit of the type shown in the drawings.

For the purpose of rotatably mounting the chip breaking element 14 in coplanar relationship with the top surface 21, the same (top surface 21) is provided with a tapped aperture (not shown) that is spaced inwardly from the end surface 23 so as to cooperatively receive therein the threaded end of a bolt 26, with this bolt 26 also being concentrically disposed within tapped aperture 27 that extends through the chip breaker 14 as indicated in Figures 1 and 3. In this manner, backing-off of the screw 26 will terminate the coplanar engagement between the chip breaker 14 and top surface 21 so as to permit removal of the cutting bit 13 therefrom for sharpening or other usual purposes. In this regard, the construction and threading arrangement of the bolt 26 may be such so that the same will cause the chip breaker 14 to move away from face 21 upon counterclockwise (Figures 1 and 3), movement of the bolt 26 as by inserting a wrench in opening 26a thereof. However, if desired, a conventional bolt may be employed so as to cause clamping of the bit 13 between chip breaker 14 and pocket 24 in known manner.

Referring next to Figures 2 and 3 of the drawing, it will be seen that the head portion 12 is further provided with a transverse bore 30 that interconnects front and rear surfaces 20 and 22 (Figure 2), and which has the central portion thereof defined by an enlarged opening 31; the arrangement being such that the enlarged opening 31 will open into surface 21 to permit positioning and withdrawal of the adjustment means 16, as will now be described.

Considering next the structure of the adjustment means 16 per se, it will be seen that the same include a threaded member 40 having axial ends 41 and 42 that respectively engage against end walls 32 and 33 of enlarged area 31, with these axial ends 41 and 42 having turning slots 43 and 44 that are capable of being engaged by a screw driver or wrench inserted in either end of the bore member 30; with these turning openings 43 and 44 being aligned with respect to the bore 30 as is clearly shown in Figure 2 of the drawings.

Surrounding the threaded member 40 is a block 45 that has an internally threaded bore that permits encirclement of the threaded shaft 40 by block 45. Additionally, it is to be noted that the block is of generally square configuration so as to include a typical side wall 46 that will engage the side wall of the central opening 31, and in this manner the engagement between the side wall 46, for example, and a side wall of the opening 31 will prevent rotation of the block 45 within opening 31. Accordingly, the block 45 will shift relatively of the longitudinal length of groove 31 upon rotation of screw shaft 40, with the walls of the opening 31 serving as ways for the block 45.

To the end of imparting a rotational movement to the chip breaker 14 around its pivot point as the same is defined by the axis of bolt 26, the block 45 further includes a projecting pin 50 that is received, as best shown in Figure 2, within an elongated slot 51 (Figure 2) that extends inwardly of surface 52 of the chip breaker member. In this manner, shifting of the block will result in engagement of pin 50 with a wall of slot 51, so that upon continuation of this shifting, the chip breaker 14 would, for example, be shifted from the full to the chain-dotted line position of Figure 1.

In use or operation of the improved adjustable chip breaker, it is merely necessary that the component parts be assembled as indicated in the drawings, and upon insertion of the cutting bit 13 and clamping of the same in place by tightening down bolt 26, the tool can be put into machining use. When it is desired to change the angle of the chip breaker, it is merely necessary that the nut 26 be backed-off slightly, at which time a turning tool, such as a wrench, can be inserted through either end of the bore 30 for engagement within either of the turning slots 43 and 44. Upon rotation in either direction, the block 45 will shift relatively of opening 31 with the result that pin 50 will act against a wall surface of the slot 51 and cause the chip breaker 14 to be rotated about its pivot point as the same is defined by the bolt 26. In this adjusted condition, bolt 26 may once again be tightened and the cutting tool will be ready for use.

In all but the severest instances, it is believed apparent that the bolt 26 can be tightened to such an extent that it will not be necessary to loosen or tighten the same to effectuate rotational movement of the chip breaker. This is true because of the fact that the chip breaker is serving as a hold-down, or clamping, member for the bit 13 and if a contact engagement with the same is made, it will normally be sufficient to hold the same in place while obviating "chattering."

It is also to be noted that in the preferred embodiment shown, a certain improved turning force is obtained, due to the moment arm that is defined by the distance between bolt 26 and pin 50. As a result of this, a higher degree of clamping pressure can be achieved without effecting the ability of the adjustment means 16 to rotate the chip breaker without loosening of the bolt 26. Specifically, it will be noted that the turning force is being applied by the pin 50 and, since this pin 50 is located at a spaced distance from the axis of the pivot point, as defined by bolt 26, a greater turning moment can be applied.

Figure 4:
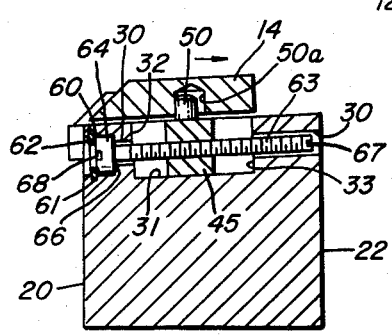
Figure 4 is a view similar to Figure 2, but illustrating a modified form of the invention.

In the modified form of the invention shown in Figure 4 of the drawings, there is contemplated a slightly modified type of advancing mechanism for the block 45 and, accordingly, where indicated, like numerals designate like parts.

Accordingly, in this modified form of the invention, one bore 30 is provided with a counterbore 60 that has a groove 61 provided in the wall thereof, within which can be received a locking ring 62. Also, in this regard, it will be seen that the threaded bolt 40 of Figures 1, 2 and 3 is replaced by a threaded bolt 63 having a head 64, with this bolt being threadingly received in block 45, as clearly shown in Figure 4 of the drawings. Accordingly, in this form of the invention the head 64 will bear against the shoulder 66 that exists between bore 30 and counterbore 60 with rotational movement of the threaded member 63 being achieved by insertion of an appropriate turning tool within end turning slot 67 or 68. In the preferred embodiment illustrated in Figure 4, it is believed apparent that the major forces on pin 50 will be transmitted to the right of Figure 4 and, accordingly, it is believed apparent that by seating the head 64 against shoulder 66 that an improved support will be provided to resist this force.

In use or operation, the device operates in the same manner as previously described in connection with Figures 1, 2 and 3 with rotational movement of shaft 63 resulting in relocating of the chip breaker 14.

Figure 5:
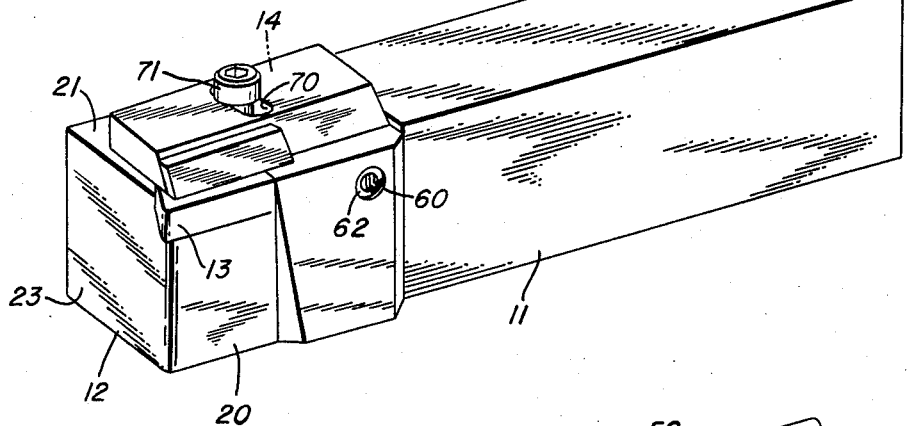
Figures 5 and 6 are perspective views illustrating a still further modified form of the invention.
Figure 6:
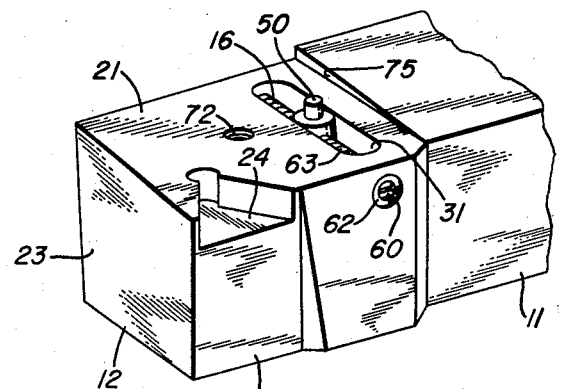

In the modified form of the invention shown in Figures 5 and 6 of the drawings, it is proposed the use of a chip breaker that does not pivot with regard to the cutting bit 13, but rather reciprocates with respect to the distance that the same is disposed from this cutting edge. Thus, and as best illustrated in Figure 5, chip breaker 14 can be provided with an elongate slot 70 within which the hold-down screw 71 can be passed for positioning in tapped aperture 72 that extends inwardly of top surface 21, as shown in Figure 6. The actuating means 16 that are employed in this modified form of the invention can be, as described above, in connection with either Figures 1 through 3 or Figure 4. It suffices to say that upon rotation of shaft 63, projecting pin 50 will reciprocate transversely on surface 21. In this regard, however, it is to be known that the connecting slot 50a that is provided on the undersurface of chip breaker 14 for reception of pin 50 is preferably not oversize, as is the case of slot 51 in Figures 1 to 3. In this manner, a close fit will be provided between pin 50 and the connecting slot therefor on chip breaker 51.

In addition to the aforementioned component parts, it will be noted that the surface 21 is defined at one end thereof by a right-angle shoulder 75, with this shoulder 75 serving as a guideway for the edge surface of chip breaker 14 that is in sliding contact therewith, as shown in Figure 5 of the drawings.

In use or operation of the device of Figure 5, it is merely necessary that an appropriate turning tool be inserted within either bore 30 and operated to effectuate rotation of shaft 63, it being assumed that hold-down screw 71 has been loosened to the extent required to permit movement of chip breaker 14 relatively of top surface 21. When this rotational movement occurs, the pin 50 will shift the chip breaker 14 transversely of surface 21 with the chip breaker 14 being guided during such movement by the position of bolt 71 in slot 70, and by the contact of the chip breaker edge surface with way 75.

While a full and complete disclosure of the invention has been made in accordance with the dictates of the patent statutes, it is not intended that the invention be so limited.

Accordingly, modifications of the invention may be resorted to without departing from the spirit hereof or the scope of the appended claims.

This application is a continuation, in part, of copending application. Serial Number 688,306, filed October 4, 1957, by Raymond E. Novkov.

What is claimed is:

1. A cutting tool of the character described, comprising; a tool holder having a seat provided therein; a cutting bit received in said seat, with said cutting bit having a cutting edge; a chip breaker rotatably secured to said tool holder and having a chip engaging surface overlying said bit when the same is received in said seat, with said chip engaging surface being engageable with said bit adjacent said cutting edge thereof, whereby said bit may be retained in said seat by said chip breaker; and means for rotating said chip breaker relatively of said tool holder in opposite directions while retaining engagement between said chip breaker and said bit, whereby said chip engaging surface can move relatively of said bit towards and from said cutting edge thereof.

2. The device of claim 1 further characterized by the presence of means for changing the angularity between said cutting edge and said chip engaging surface during relative rotation therebetween.

3. A cutting tool of the character described, comprising; a tool holder having a seat provided therein; a cutting bit received in said seat, with said cutting bit having a cutting edge; chip breaker rotatably secured to said tool holder and having a chip engaging surface overlying said bit when the same is received in said seat, with said chip engaging surface being engageable with said bit adjacent said cutting edge thereof, whereby said bit may be retained in said seat by said chip breaker; and means for rotating said chip breaker relatively of said tool holder in opposite directions while retaining engagement between said chip breaker and said bit, whereby said chip engaging surface can move relatively of said bit towards and from said cutting edge thereof; said means including a pin and groove connection between said chip breaker and said holder, with said connection being spaced from said point of rotational mounting between said holder and said chip breaker, whereby movement of said pin will cause relative rotation between said holder and said chip breaker.

4. The device of claim 3 further characterized by the fact that said pin is carried by said holder and moves relatively thereof.

5. A cutting tool of the character described, comprising; a tool holder having top, front and rear surfaces and having a seat defined by a recess that intersects said top and front surfaces and with said tool holder having a first bore that communicates between said front and rear surfaces and a second bore that extends inwardly from said top surface; a cutting bit received in said seat, with said cutting bit having a cutting edge that projects beyond said front surface; a chip breaker overlying said top surface of said tool holder and also having a chip engaging surface that contacts said bit received in said seat; said chip breaker being apertured and having said aperture aligned with said second bore; a bolt received through said aperture of said chip breaker and also received within said second bore, whereby said chip breaker is rotatable relatively of said tool holder; and adjustment means received in said first bore and being connected with said chip breaker, whereby said chip breaker may be rotated about said bolt upon operation of said adjustment means.

6. The device of claim 5 further characterized by the fact that said adjustment means include a threaded shaft rotatable in said first bore and being fixed against axial movement relatively thereof; a pin member having a base portion that is provided with a threaded aperture that is in threaded engagement with said threaded shaft, with said pin moving axially of said bore upon rotation of said shaft; said chip breaker having a slot provided on one face thereof; said slot receiving said pin at a spaced distance from said bolt, whereby rotation of said shaft will rotate said chip breaker around said bolt.

7. A cutting tool of the character described, comprising; a tool holder having a seat provided therein; a cutting bit received in said seat, with said cutting bit having a cutting edge; a chip breaker rotatably secured to said tool holder and having a chip engaging surface overlying said bit when the same is received in said seat, with said chip engaging surface being engageable with said bit adjacent said cutting edge thereof, whereby said bit may be retained in said seat by said chip breaker; a pin member carried by said tool holder in shiftable relationship therewith and projecting beyond said tool holder; said pin releasably interlocking with said chip breaker at a point spaced from the point of pivotal connection between said chip breaker and said tool holder, whereby shifting of said pin relatively of said tool holder will result in rotation of said chip breaker relatively of said tool holder.

References Cited in the file of this patent

UNITED STATES PATENTS

| 2,799,079 | Brigner | July 16, 1957 |

FOREIGN PATENTS

| 750,032 | Germany | Dec. 13, 1944 |
| 1,041,370 | France | May 27, 1953 |